United States Patent [19]

Elger

[11] 4,032,824
[45] June 28, 1977

[54] VARIABLE-SPEED 3-PHASE DRIVE

[75] Inventor: Harald Elger, Erlangen, Germany

[73] Assignee: Siemens Aktiengesellschaft, Munich, Germany

[22] Filed: Dec. 15, 1975

[21] Appl. No.: 640,958

[30] Foreign Application Priority Data

Dec. 20, 1974 Germany ............................ 2460639

[52] U.S. Cl. .................................. 318/45; 318/84; 318/197; 318/237
[51] Int. Cl.[2] ........................................ H02D 7/36
[58] Field of Search .................. 318/45, 49, 50, 84, 318/197, 237

[56] References Cited

UNITED STATES PATENTS

| 3,039,034 | 6/1962 | Lee | 318/84 X |
| 3,515,969 | 6/1970 | Magnuson et al. | 318/237 X |
| 3,531,701 | 9/1970 | Shibata | 318/45 |
| 3,549,968 | 12/1970 | Shibata | 318/45 |
| 3,683,251 | 8/1972 | Pisecker | 318/237 |

Primary Examiner—Gene Z. Rubinson
Attorney, Agent, or Firm—Kenyon & Kenyon, Reilly, Carr & Chapin

[57] ABSTRACT

A variable-speed three-phase drive is disclosed. The drive includes a switchable, undersynchronous converter cascade for driving two mechanically coupled asynchronous motors which have slip ring rotors and which can be connected separately to a three-phase network. The slip ring rotors of the two asynchronous motors are connected, respectively, with the three-phase terminals of different uncontrolled rectifiers. The latter two rectifiers, together with two inverters and two other rectifiers, are arranged in a ring circuit in such a manner that two rectifiers are always followed by an inverter. In accord with the invention, a switch is provided for connecting the three-phase terminals of the two rectifiers which are disposed on the respective cathode sides of the two inverters, and for also connecting the three-phase terminals of the two rectifiers which are disposed on the respective anode sides of the two inverters.

3 Claims, 3 Drawing Figures

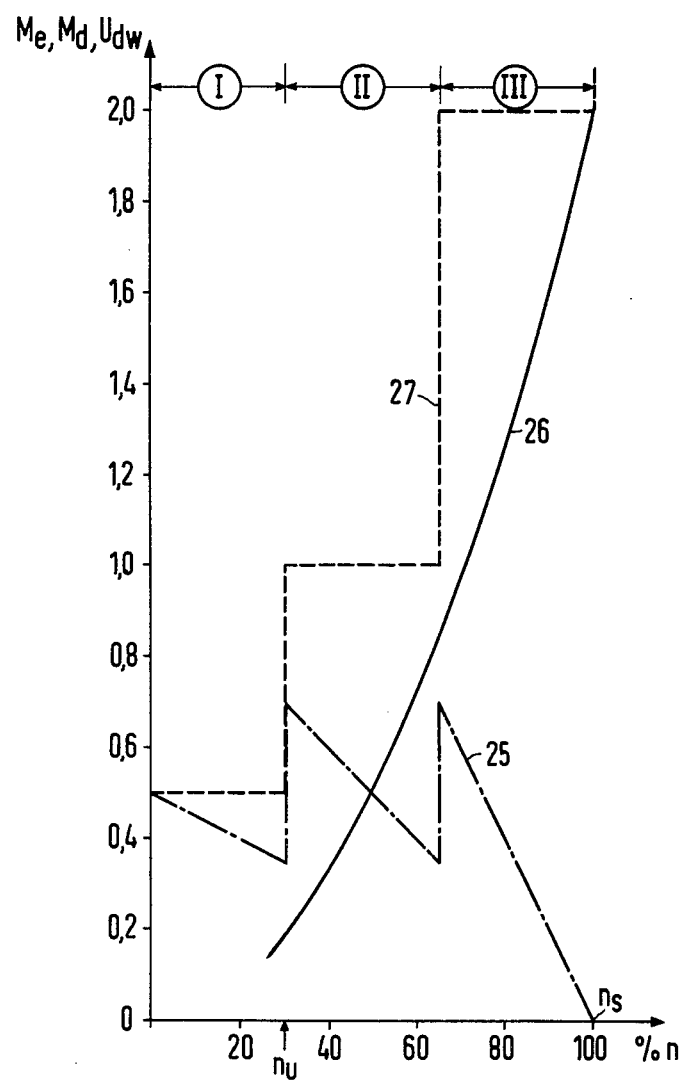

VARIABLE-SPEED 3-PHASE DRIVE

BACKGROUND OF THE INVENTION

1. Field of the Invention

The invention concerns a variable-speed three-phase drive and, in particular a variable-speed three-phase drive which includes an asynchronous motor which is adapted to be connected to a three-phase network.

2. Description of the prior art

A particular type of three-phase drive is known in which the asynchronous motor includes a slip ring rotor which is connected with the three-phase terminals of a first, uncontrolled rectifier which is in the form of a bridge circuit. In this drive, the aforesaid rectifier is connected with two inverters and a second, uncontrolled rectifier which is also in the form of a bridge circuit. In particular, the latter elements are connected in alternating order in a ring circuit such that the DC terminals of succeeding rectifiers and inverters are connected with each other. Also, in this known drive, the three-phase terminals of the aforesaid inverters are adapted to be fed back to the three-phase network connected to the motor and the three-phase terminals of the two rectifiers are adapted to be connected with each other via a circuit breaker.

The above-described known three-phase drive is disclosed in detail in the German Pat. No. 1,638,646 and in the publication issued by Siemens AG with the title "Untersynchrone Stromrichterkaskade mit automatischer Stellbereichanpassung" (Undersynchronous converter cascade with automatic adaptation of the control range). As described above and indicated in the latter references, the circuitry of the drive is in the form of a so-called switchable undersynchronous converter cascade. Such a cascade, as compared to an undersynchronous converter cascade which cannot be switched, is less expensive and requires reduced reactive-power consumption, particularly in the upper speed range.

In operation, in the lower part of the speed control range, the switch or circuit breaker of the drive is open and only one rectifier is connected to the slip ring rotor. In this operating condition, the two inverters are connected in series via the second rectifier, which has no voltage. In the upper part of the speed control range, the switch of the drive is closed, thereby also connecting the second rectifier to the slip ring rotor. Thus, in this case two parallel frequency converters are formed, each including one-half of a bridge of a different one of the two rectifiers and an inverter.

Switchable undersynchronous converter cascades of the above type are employed particularly in the drive circuitry for driving pumps or blowers, where the rotor current increases approximately as the square of the speed. In the latter cases, the frequency converter, which includes a rectifier and an inverter, must draw a low current and a high voltage at low speed and a high current and a low voltage at high speed. The described switchable undersynchronous converter cascade adapts itself to this current-voltage characteristic in two steps.

It is an object of the present invention to modify the above-described three-phase drive so as to include two motors, while still retaining the advantages attributable to the switchable undersynchronous converter cascade.

SUMMARY OF THE INVENTION

The above and other objects are realized in accordance with the present invention by modifying the above-described three-phase drive by including therein a second asynchronous motor which has a slip ring motor and which is mechanically coupled with the first asynchronous motor. More particularly, the slip ring rotor of the second motor is connected to the three-phase terminals of a third, uncontrolled rectifier which is in the form of a bridge circuit. The latter rectifier and a fourth, uncontrolled rectifier also in the form of a bridge circuit are inserted into the ring circuit, the third rectifier being connected in series with the first rectifier and the fourth rectifier with the second rectifier. Additionally, a switch is provided for connecting the three-phase terminals of the two rectifiers which are connected in the ring circuit on the respective cathode sides of the inverter and for connecting the three-phase terminals of the two rectifiers which are connected in the ring circuit on the respective anode sides of the two inverters.

With the three-phase drive arranged as described above, the drive can be operated in three speed ranges. As a result, the current in the converter portion of the drive can be halved twice, thereby realizing considerable savings in the size of the converter. More particularly, in a starting-up range, only one of the asynchronous motors is connected. In this case, the two inverters are capable of providing the countervoltage for both motors, and the otherwise required starter becomes unnecessary. When the speed reaches the lower limit of an operational speed range, the second asynchronous motor is brought into operation, and the two inverters and the third and fourth rectifier are now connected in series. With a considerably smaller load for each individual motor, the drive now delivers the same nominal torque as in a drive with one motor. In the upper speed range, the switch is closed. Thus, in this range two intermediate-link frequency converters connected in parallel are formed, each motor being connected via a rectifier with the intermediate link of each converter. This results in a doubling of the permissible rotor current and the three-phase drive can deliver in the limit a torque which is about twice as large as the nominal torque of one motor. In this upper speed range, it is important that the uncontrolled rectifiers be connected in series on the DC side. This results in the same rotor current for each individual motor, and the motors, therefore, deliver the same torque at their shafts. Thereby, an even load distribution between the individual motors is achieved without additional control even in the case of different motor speeds.

BRIEF DESCRIPTION OF THE DRAWINGS

The above and other features and aspects of the present invention will become more apparent upon reading the following detailed description in conjunction with the accompanying drawings, in which:

FIG. 3 shows waveform diagrams for certain parameters of the drive of FIGS. 1 and 2.

DETAILED DESCRIPTION

Figure 1:
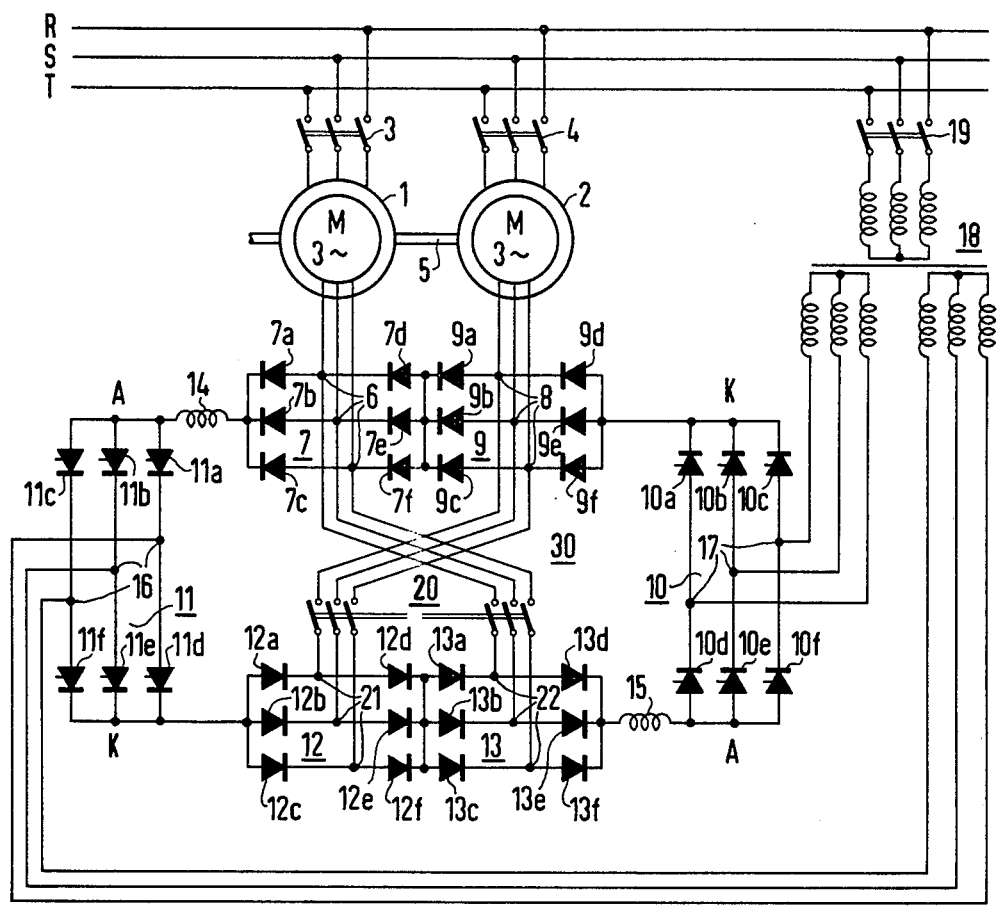
FIGS. 1 and 2 show a variable-speed three-phase drive in accordance with the principles of the present invention.

FIG. 1 shows a three-phase drive in accordance with the principles of the present invention. The drive of FIG. 1 can, preferably, be used as a pump or blower drive. As shown, it comprises two asynchronous motors 1 and 2 which are both connected via respective switches 3 and 4 to phases R, S and T of a three-phase network. The motors 1 and 2 are mechanically coupled with each other via a shaft 5. Instead of the aforesaid mechanical coupling, the motors may also be coupled with each other in a fixed manner via a common transmission, e.g., a spur gear of the driven machine, or via a track, or with variable speed ratio. Moreover, in the case of non-constant torque, the mechanical coupling can be omitted entirely and the motors can be used for the separate operation of two driven machines.

The three-phase terminals 6 of an uncontrolled rectifier 7 are connected with the slip ring rotor of the asynchronous motor 1, and the three-phase terminals 8 of an uncontrolled rectifier 9 with the slip ring rotor of the asynchronous motor 2. The rectifiers 7 and 9 are comprised of first and second sets of six diodes 7a to 7f and 9a to 9f, respectively, each set of diodes being connected in a three-phase bridge circuit. The two rectifiers, moreover, are connected directly in series, i.e., they are connected with each other via their DC terminals.

The series connection rectifiers 7 and 9 is arranged in a ring circuit 30 whose other members include two inverters 10 and 11 and two other uncontrolled rectifiers 12 and 13. As shown, the inverters 10 and 11 are line commutated and comprise groups of thyristors 10a to 10f and 11a to 11f, respectively, each group being arranged in a three-phase bridge circuit. The two uncontrolled rectifiers 12 and 13, on the other hand, are comprised of groups of diodes 12a to 12f and 13a to 13f, respectively, each of these groups also being arranged in a three-phase bridge circuit. The two rectifiers 12 and 13 are also connected directly in series i.e., they are connected at their DC terminals.

The ring circuit 30 is formed such that the series-connected rectifiers 7 and 9 and the series-connected rectifiers 12 and 13 are each followed by a different one of the inverters 10 and 11 and such that the rectifiers and inverters are connected with each other at their DC terminals. To provide smoothing of the DC current, two chokes 14 and 15 are also included in the ring circuit 30 in such a manner that the chokes are either on the anode side A or on the cathode side K of the inverters 10 and 11. The chokes 14 and 15 can also be connected between the series connected rectifiers 7 and 9, and 12 and 13, respectively.

The three-phase terminals 16 of the inverter 11 and the three-phase terminals 17 of the inverter 10 are separately coupled to a three-phase transformer 18 which is connected to the three-phase supply network via a switch 19.

Another switch 20 is provided for connecting the three-phase terminals 21 of the rectifier 12 to the three-phase terminals 8 of the rectifier 9 and the three-phase terminals 22 of the rectifier 13 to the three-phase terminals 6 of the rectifier 7. Operation of switch 20 thus permits the three-phase terminals 6, 8, 21 and 22 of the rectifiers 7, 9, 12 and 13 to be connected with each other crosswise. In other words, such operation permits the three-phase terminals of those rectifiers to be connected together which are either both on the anode side A or both on the cathode side K of the inverters 10 and 11.

Figure 2:
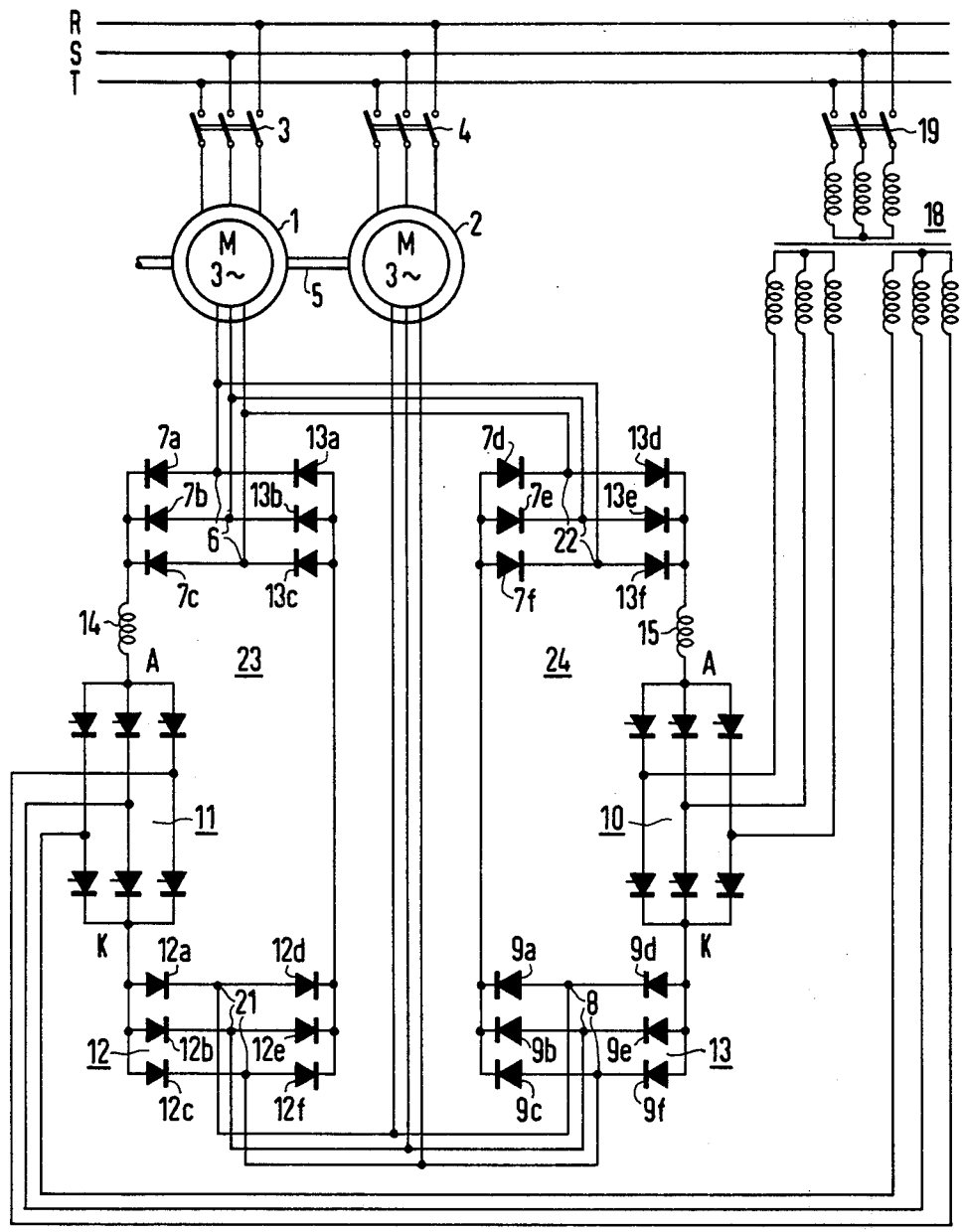

If the switch 20 is open, then the ring circuit 30 acts as a frequency converter with intermediate link and impressed current, since in this case the series connected rectifiers 7 and 9 and the inverters 10 and 11 are connected in series via the rectifiers 12 and 13, which have no voltage. If the switch 20 is closed, the circuit takes the form as is shown in FIG. 2. In this latter case, therefore, two frequency converters 23 and 24 with intermediate DC links are formed. These converters are connected in parallel and each is connected to the slip ring rotor of one of the asynchronous motors 1 and 2 via one rectifier. Because of the parallel connection of the converters, the diodes 7a to 7c and 13a to 13c form a new rectifier bridge circuit for the slip ring rotor of the asynchronous motor 1, and the diodes 7d to 7f and 13d to 13f form a new rectifier bridge circuit for the slip ring rotor of the asynchronous motor 2.

The thyristors of the inverters 10 and 11 receive their firing pulses from a control unit such as is commonly used for controlled converters and is described, for example, by G. Moeltgen in "Line-Commutated Converters with Thyristors", Siemens AG 1967, pages 275 and 280. As is also described in the latter reference, the control unit is, in turn, fed a control voltage from a regulator. The aforesaid control unit and the regulator have not been shown in FIGS. 1 and 2 in order to preserve the clarity of the drawings.

It should be noted that the two asynchronous motors 1 and 2 or the two asynchronous motors 1 and 2 and the transformer 18 in FIG. 1 may be connected to the three-phase network via a common switch. Furthermore, additional starting resistors may also be provided.

The operation of the three-phase drive of FIGS. 1 and 2 will now be explained in detail by making reference to FIG. 3. In the latter figure, the DC voltage $U_{dw}$ at one of the inverters, the load torque $M_e$ and the total permissible drive torque $M_d$ at the motor shafts are plotted versus the speed (% of nominal speed n). The values of the parameters $M_d$, $M_e$ and $U_{dw}$ have been normalized in FIG. 3 such that the rectified zero-speed rotor voltage and the nominal (rated) torque correspond to the value 1 for $U_{dw}$ and $M_d$, respectively.

The speed control will be explained by assuming the drive is for use in driving a blower with a square-law torque characteristic. In FIG. 3, the DC voltage $U_{dw}$ is represented by the curve 25, the load characteristic $M_e = f(n)$ by the curve 26 and the torque limit, i.e., the total permissible drive torque, by the curve 27. Moreover, three operating ranges designated I, II and III are illustrated. The starting-up range I extends from standstill of the asynchronous motors 1 and 2 to the lowest speed $n_u$ of the operational speed control range, which range is covered by the operating ranges II and III.

In the starting-up range I, only one motor, e.g., the asynchronous motor 1, and the transformer 18 are connected via the respective switches 3 and 19 to the three-phase network. The switch 4 and the switch 20 are open. In this case, the slip-dependent rotor voltage of the asynchronous motor 1 is rectified by the rectifier 7. The rectified rotor voltage, in turn, is counteracted by the sum of the countervoltages of the two inverters 10 and 11 and is divided between these two inverters. The asynchronous motor 1 now supplies the entire load torque, while the asynchronous motor 2 is idle. Assuming that the current in the intermediate link is limited by the regulator to 50% of rated current, then the entire drive delivers maximally 0.5 + 0 = 0.5 times the nominal torque of one motor to the shaft, as may be seen from curves 25 and 27 of FIG. 3.

If the drive reaches the speed $n_u$, then the asynchronous motor 2 is brought into operation, and one enters the second operating range II. This operating range corresponds to a medium speed range and extends between the lowest speed $n^u$ and about the middle of the total speed control range. In this second range, both asynchronous motors 1 and 2 and the transformer 18 are connected via the closed switches 3, 4 and 19 to the three-phase network. The switch 20, however, still remains open.

In this second operating range, the slip-dependent, rectified rotor voltages of both asynchronous motors 1 and 2 are added due to the series connection of the two rectifiers 7 and 9 and the added voltage divided between the two inverters 10 and 11. The latter rectifiers are now capable of supplying the countervoltage for both motors 1 and 2, as the rectified slip voltage has dropped by about one-half. The rectifiers 12 and 13 remain in this case out of operation, as the switch 20 is open.

The asynchronous motors 1 and 2 now jointly supply the torque which was previously supplied by the asynchronous motor 1 before the switch 4 was closed. The torque of the asynchronous motor 1 is, therefore, halved and thereby, its rotor current is also halved. The asynchronous motor 2, on the other hand, now carries the same rotor current as the asynchronous motor 1, since the rectifiers 7 and 9 are connected in series. If the same limitation of the current is assumed as in the operating range I, the total drive unit, i.e., both connected asynchronous motors 1 and 2, will deliver maximally $0.5 + 0.5 = 1$ times the nominal torque of a single motor.

If the speed is increased further, the slip voltage of both asynchronous motors 1 and 2 decreases to the extent that each of the two inverters 10 and 11 is capable of taking over the sum of the voltages of both motors. In such case, the switch 20 can be closed and the third operating range III is reached. This range corresponds to an upper speed range and extends between the middle of the speed control range and the synchronous speed $n_s$. In this range, the asynchronous motors are operated in a circuit as is shown in FIG. 2, where the frequency converter is divided up into two parallel-operating halves. This results in an even division of the respective rotor currents among the rectifiers, which are connected together on the three-phase side. The rotor current of the asynchronous motor 1, for example, is divided between the two rectifiers 5 and 7. In this case, the sum of the rectified rotor voltages of the two motors 1 and 2 is present at each inverter and the two frequency converters 23 and 24 carry only one-half the rectified rotor current of one motor. Thus, a further, second halving of the current in the frequency converter part is achieved.

If it is again assumed that the current limitation corresponds to the limitation assumed in the ranges I and II, this then results in a doubling of the permissible rotor current from previously 0.5 to 1, and, therefore, in a maximum-limit torque for the entire drive of $2 \times 2$ times the nominal torque of one motor.

The gradation of the torque limitation described above for the present drive is particularly well suited for a square-low load characteristic $M_e = f(n)$, as in drawn in FIG. 3. The torque limitation 27 can be adapted to the load characteristic 26 via the level of the current limitation and the width of the respective speed ranges I to III.

In a conventional undersynchronous converter cascade having no switching, the full motor power must be supplied by the converter. This means that for two motors, the converter would have to be designed so that it can supply $2 D_d$. In the present three-phase drive of FIGS. 1 and 2, the converter needs to supply only an amount of power equal to 0.7 of the drive power of one motor. The cost of the converter, therefore, is reduced substantially. More particularly, if one compares the cost of the aforesaid undersynchronous converter cascade, having no switching, with the present drive in the case of a square-law load characteristic and in a speed control range as given in FIG. 3, one obtains a cost ratio of $0.35 (= 0.7/2)$. Moreover, as with the cost of the converter, the reactive control power of the inverters 10 and 11 also drops.

As can be appreciated, the series connection of the uncontrolled rectifiers on the DC side enables the same DC current to flow in the uncontrolled rectifiers in the operating ranges I, II and III and, therefore, also enables the same rotor current to flow in such ranges for each of the asynchronous motors 1 and 2. Thus, one obtains the same torque for the two motors. The latter also holds true for any relative angle position of the asynchronous motors 1 and 2 and also for different speeds. An even division of the load between the two individual motors is thereby obtained without additional control even for different motor speeds. The aforesaid result applies as well where the slip ring rotors of the motors 1 and 2 are not coupled with each other, and also where such motors are coupled directly with any reduction ratio or via transmissions with fixed or variable transmission ratio.

It should further be mentioned, moreover, that for a given countervoltage generated by the inverters, the sum of the speeds of the individual motors is constant, the speed of the individual motors being adjustable at will. By connecting the rectifiers in series, an electrical differential drive can, therefore, be formed thus permitting the present drive to also be usable as a vehicle drive.

In summary, it can be noted that with the three-phase drive of the invention, a drive employing several motors has been realized which has the advantage of including a cascade of switchable undersynchronous converters. More specifically, such a cascade permits a second motor to be switched into the drive circuit and also the drive circuit to be switched from series to parallel operation, thereby causing the current in the converter drive portion to be halved twice, which is of importance particularly in the case of drives with linearly or faster than linearly increasing torque-vs-speed characteristic. In particular, the delayed connecting of the second motor into the circuit permits starting equipment having resistors to be eliminated therefrom and additionally eliminates the accompanying difficulties of switching from resistor to cascade operation. As a result, the size of the entire frequency converter, the chokes and the transformer is reduced to one-half, and the equipment cost becomes considerably lower in spite of the use of additional components.

What is claimed is:

1. A variable-speed three-phase drive for use with a three-phase network, said drive comprising:

first and second asynchronous motors each adapted to be connected to said network and each having a slip ring rotor;

first and second uncontrolled rectifiers, each of said rectifiers having a DC terminal connected to a DC terminal of the other and each having three-phase terminals connected to the rotor of a different one of said motors;

third and fourth uncontrolled rectifiers, each of said rectifiers having a DC terminal connected to a DC terminal of the other and each having three-phase terminals;

first and second inverters each having three-phase terminals adapted to be connected to said network, said first inverter having DC terminals which are connected with respective DC terminals of said first and said third uncontrolled rectifiers and said second inverter having DC terminals which are connected with respective DC terminals of said second and fourth uncontrolled rectifiers, whereby said first and second inverters and said first and second and said third and fourth uncontrolled rectifiers form a ring circuit;

and switch means for connecting together the three-phase terminals of the two uncontrolled rectifiers connected to the respective anode sides of said first and second inverters and for connecting together the three-phase terminals of the two uncontrolled rectifiers connected to the respective cathode sides of said first and second inverters.

2. A drive in accordance with claim 1 in which:

the anode of said first inverter is connected to said first uncontrolled rectifier and the cathode of said first inverter to said third uncontrolled rectifier; and the anode of said second inverter is connected to said fourth uncontrolled rectifier and the cathode of said first inverter is connected to said second uncontrolled rectifier.

3. A drive in accordance with claim 2 in which:

each of said uncontrolled rectifiers is a three-phase bridge circuit;

and said switch means interconnects the three phases of said first and fourth uncontrolled rectifiers and interconnects the three phases of said second and third uncontrolled rectifers.

* * * * *